(12) United States Patent
Sakurai et al.

(10) Patent No.: US 9,688,386 B2
(45) Date of Patent: Jun. 27, 2017

(54) HIGH-POSITIONED 2-POSITION VARIABLE CAMBER KRUEGER

(71) Applicant: The Boeing Company, Chicago, IL (US)

(72) Inventors: Seiya Sakurai, Seattle, WA (US); Stephen J. Fox, Everett, WA (US); Victor H. Reyes, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/180,707

(22) Filed: Jun. 13, 2016

(65) Prior Publication Data

US 2016/0297513 A1    Oct. 13, 2016

Related U.S. Application Data

(62) Division of application No. 13/867,562, filed on Apr. 22, 2013, now Pat. No. 9,365,284.

(51) Int. Cl.
| | | |
|---|---|---|
| *B64C 9/24* | (2006.01) | |
| *B64C 9/02* | (2006.01) | |
| *B64C 9/34* | (2006.01) | |

(52) U.S. Cl.
CPC ............... *B64C 9/24* (2013.01); *B64C 9/02* (2013.01); *B64C 9/34* (2013.01)

(58) Field of Classification Search
CPC .... B64C 9/24; B64C 9/22; B64C 9/34; B64C 9/02; B64C 9/04; B64C 3/50
See application file for complete search history.

(56) References Cited

U.S. PATENT DOCUMENTS

| | | |
|---|---|---|
| 3,941,334 A | 3/1976 | Cole |
| 4,159,089 A | 6/1979 | Cole |
| 4,189,121 A | 2/1980 | Harper et al. |
| 4,262,868 A | 4/1981 | Dean |
| 5,158,252 A | 10/1992 | Sakurai |
| 6,375,126 B1 | 4/2002 | Sakurai et al. |
| 7,578,484 B2 | 8/2009 | Fox et al. |
| 9,016,637 B2 * | 4/2015 | Sakurai ............... B64C 9/24 244/214 |
| 2010/0140414 A1 | 6/2010 | Beyer et al. |

FOREIGN PATENT DOCUMENTS

| | | |
|---|---|---|
| CN | 101466597 A | 6/2009 |
| WO | WO 2008/051286 A2 | 5/2008 |

OTHER PUBLICATIONS

Extended European Search Report EP14165185.1 mailed Nov. 10, 2014.

\* cited by examiner

*Primary Examiner* — Brian M O'Hara
(74) *Attorney, Agent, or Firm* — McDonnell Boehnen Hulbert & Berghoff LLP (57) ABSTRACT

A variable camber Krueger flap deployment linkage mechanism is presented. A first linkage assembly couples a flap assembly and an airfoil, and comprising a first drive arm, a first drive link, and a support arm. A second linkage assembly couples the flap assembly and the first drive arm, and comprises a drive transfer arm, a middle connection segment, and a bullnose link.

20 Claims, 7 Drawing Sheets

FIG. 9

HIGH-POSITIONED 2-POSITION VARIABLE CAMBER KRUEGER

CROSS-REFERENCE TO RELATED APPLICATIONS

This application is a divisional of U.S. application Ser. No. 13/867,562, filed Apr. 22, 2013, which is incorporated by reference herein in its entirety.

FIELD

Configurations of the present disclosure relate generally to fluid-dynamic design. More particularly, configurations of the present disclosure relate to design of fluid-dynamic control surfaces.

BACKGROUND

In aeronautics and aeronautical engineering, a Krueger flap is generally a wing leading edge device that provides high-lift capability. A camber of a Krueger flap may comprise an asymmetry between an upper surface and a lower surface of an airfoil of the Krueger flap. A camber of an airfoil can be defined by a camber line, which is a curve that is halfway between the upper surface and the lower surface of the airfoil. Camber is generally an important contributing factor determining a stall speed of an aircraft. A change in a camber of an airfoil can change a stall speed of an aircraft.

SUMMARY

A variable camber Krueger flap deployment linkage mechanism is presented. A first linkage assembly couples a flap assembly and an airfoil, and comprising a first drive arm, a first drive link, and a support arm. A second linkage assembly couples the flap assembly and the first drive arm, and comprises a drive transfer arm, a middle connection segment, and a bullnose link. The first drive arm is coupled to an actuator coupled to the airfoil, and rotates in a chord-wise plane. The first drive link is coupled to the first drive arm and a trailing end of the flap assembly. The support arm is coupled to a middle link portion of the first drive link and rotatably couples to the airfoil at a rotation joint. The drive transfer arm is coupled to the flap assembly. The middle connection segment couples the drive transfer arm to the trailing end of the flap assembly. The bullnose link couples the drive transfer arm to a bullnose portion of the flap assembly.

In this manner, configurations of the disclosure provide a high-positioned two-position variable camber Krueger flap that provides high-lift capability.

In a configuration, a variable camber Krueger flap deployment linkage mechanism comprises a first linkage assembly and a second linkage assembly. The first linkage assembly couples a flap assembly and an airfoil, and comprises a first drive arm, a first drive link, and a support arm. The first drive arm is coupled to an actuator coupled to the airfoil, and rotates in a chord-wise plane. The first drive link is coupled to the first drive arm and a trailing end of the flap assembly. The support arm is coupled to a middle link portion of the first drive link and rotatably couples to the airfoil at a rotation joint. The second linkage assembly couples the flap assembly and the first drive arm, and comprises a drive transfer arm, a middle connection segment, and a bullnose link. The drive transfer arm is coupled to the flap assembly. The middle connection segment couples the drive transfer arm to the trailing end of the flap assembly. The bullnose link couples the drive transfer arm to a bullnose portion of the flap assembly.

In another configuration, a method to enable high-lift over a fluid-dynamic body using a variable camber Krueger flap deploys a sequence of flap positions where the variable camber Krueger flap is below and aft of a wing leading edge before reaching a configured takeoff and landing position. The method further positions the variable camber Krueger flap in a high position relative to the wing leading edge when the variable camber Krueger flap is fully deployed.

In a further configuration, a flap linkage assembly is operable to couple to a flap assembly comprising a bullnose member, a trailing end member, and a flexible surface coupled between the bullnose member and the trailing end member. The flap linkage assembly comprises a flap link, a flap trailing end link, a first drive arm, a first drive link, and a support arm. The flap link is coupled to the bullnose member. The flap trailing end link is coupled to the trailing end member and the flap link, and the flap link is coupled to the trailing end member via the flap trailing end link. The first drive arm couples to an actuator coupled to an airfoil, and rotates in a chord-wise plane. The first drive link is coupled to the first drive arm and a trailing end of the flap assembly via the flap trailing end link. The support arm is coupled to a middle link portion of the first drive link and rotatably coupled to the airfoil at a rotation joint.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of configurations of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of configurations of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Configurations of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, vehicle structures, fluid dynamics, flight control systems, and other functional aspects of systems described herein (and the individual operating components of the systems) may not be described in detail herein. In addition, those skilled in the art will appreciate that configurations of the present disclosure may be practiced in conjunction with a variety of hardware and software, and that the configurations described herein are merely example configurations of the disclosure.

Configurations of the disclosure are described herein in the context of a non-limiting application, namely, an aircraft Krueger flap. Configurations of the disclosure, however, are not limited to such aircraft Krueger flap applications, and the techniques described herein may also be utilized in other applications. For example but without limitation, configurations may be applicable to hydrofoils, wind turbines, tidal power turbines, or other fluid dynamic surface.

As would be apparent to one of ordinary skill in the art after reading this description, the following are examples and configurations of the disclosure and are not limited to operating in accordance with these examples. Other configurations may be utilized and structural changes may be made without departing from the scope of the exemplary configurations of the present disclosure.

Figure 1:
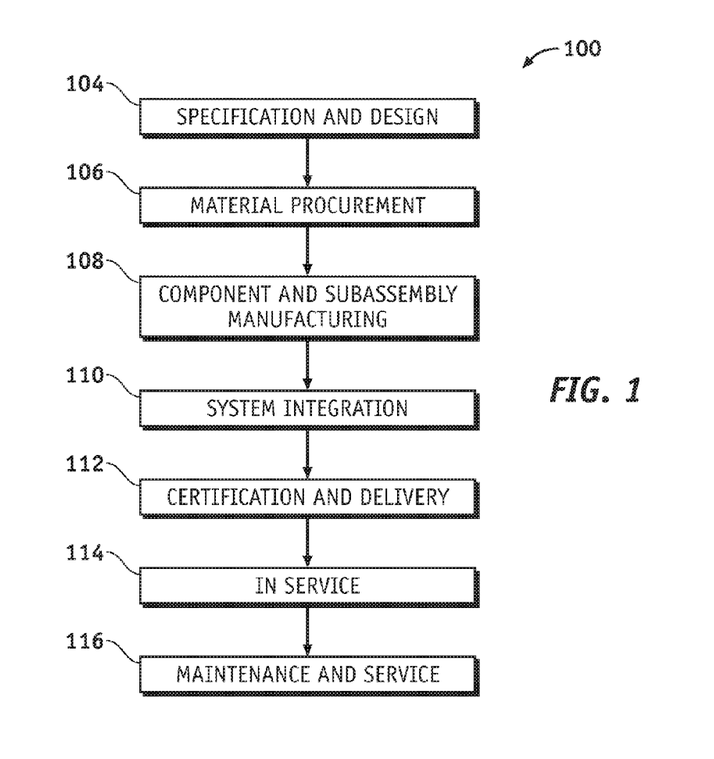
FIG. 1 is an illustration of a flow diagram of an exemplary aircraft production and service methodology.
Figure 2:
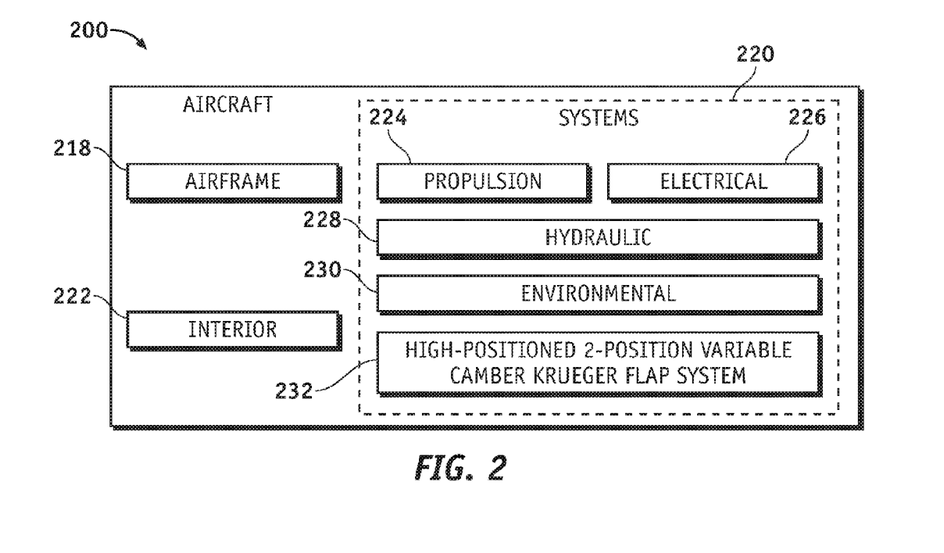
FIG. 2 is an illustration of an exemplary block diagram of an aircraft.

Referring more particularly to the drawings, configurations of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a high-positioned 2-position variable camber Krueger flap system 232. Any number of other systems may also be included. Although an aerospace example is shown, the configurations of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus configurations, method configurations, or a combination thereof may be utilized during production stages of the process 108 and the system integration 110, for example, by substantially expediting assembly of or reducing the cost of an aircraft 200. Similarly, one or more of apparatus configurations, method configurations, or a combination thereof may be utilized while the aircraft 200 is in service, for example and without limitation, to maintenance and service 116.

Configurations of the disclosure provide a high-positioned 2-position variable camber Krueger flap that provides high-lift capability. The Krueger flap is positioned high, relative to the wing, in the airplane takeoff and landing positions. During deployment, the Krueger flap avoids transition stalls.

Figure 3:
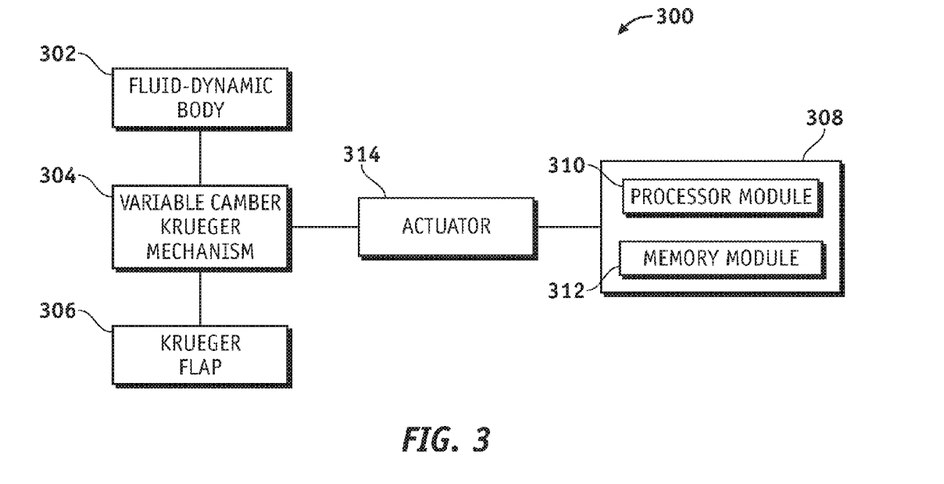
FIG. 3 is an illustration of an exemplary variable camber fluid-dynamic body system according to a configuration of the disclosure.

FIG. 3 is an illustration of an exemplary variable camber fluid-dynamic body system 300 (system 300) according to a configuration of the disclosure. The system 300 may comprise, a fluid-dynamic body 302 (airfoil 302), a variable camber Krueger mechanism 304, a Krueger flap 306, an actuator 314, and a controller 308.

The airfoil 302 comprises a variable camber resulting from deployment of the Krueger flap 306 by the variable camber Krueger mechanism 304. The airfoil 302 may comprise a lifting surface and/or a control surface of a fluid-dynamic body (e.g., an aerodynamic body 504 shown in cross section in FIG. 5). The lifting surface may comprise, for example but without limitation, a wing, a canard, a horizontal stabilizer, or other lifting surface. The control surface may comprise, for example but without limitation, a slat, an aileron, a tail, a rudder, an elevator, a flap, a spoiler, an elevon, or other control surface.

The Krueger flap 306 changes a camber of the airfoil 302 when the Krueger flap 306 is deployed by the variable camber Krueger mechanism 304. Furthermore, a camber of the Krueger flap 306 may change during deployment of the Krueger flap 306 by the variable camber Krueger mechanism 304. Krueger flap 306, flap assembly 502 (FIG. 5), and variable camber Krueger flap 306 may be used interchangeably in this document. The variable camber Krueger flap 306 may comprise, for example but without limitation, a flap link 572, a bullnose link 574, and a drive transfer arm 576 (FIG. 5), or other flap component. The variable camber Krueger flap 306 may be operable to change camber in response to control from the variable camber Krueger mechanism 304.

The airfoil 302 is operable to configure a shape of a camber 414 (FIG. 4) to a first camber configuration using the variable camber Krueger mechanism 304 to deploy the Krueger flap 306 at a first camber position in response to a first control actuation command. The airfoil 302 is further operable to configure a shape of the camber 414 (FIG. 4) to reshape the first camber configuration to a second camber configuration using the variable camber Krueger mechanism 304 to deploy the Krueger flap 306 at a second camber position in response to a second control actuation command by the actuator 314. In this manner, a camber profile of the airfoil 302 changes from a fixed camber profile prior to an actuation of the variable camber Krueger mechanism 304 to a variable camber profile after the actuation of the variable camber Krueger mechanism 304. The camber 414 (FIG. 4) of the airfoil 302 may be defined by a mean camber line 410 (FIG. 4), which is the curve that is halfway between an upper surface 420 (FIG. 4) and a lower surface 422 (FIG. 4) of the airfoil 302 (airfoil 400 in FIG. 4).

The variable camber Krueger mechanism 304 is operable to vary a shape (i.e., bend, deflect, change shape) of a camber in response to an actuation command. In this manner, the camber 414 can change shape to alter a flow over the airfoil 302/400. In one configuration, the variable camber Krueger mechanism 304 may be made from a shape memory alloy material and be controlled via a passive control mechanism to control the shape of the camber 414 based on an ambient temperature corresponding to an altitude at a flight condition. In another configuration, the controller 308 may include or be realized as a controller (connected to the aircraft systems), to facilitate controlling a change in the shape of the camber 414. The variable camber Krueger mechanism 304 according to various configurations is discussed in more detail below in the context of discussion of FIGS. 5-8.

The controller 308 may comprise, for example but without limitation, a processor module 310, a memory module 312, or other module. The controller 308 may be implemented as, for example but without limitation, a part of an aircraft system, a centralized aircraft processor, a subsystem computing module comprising hardware and software devoted to the variable camber Krueger mechanism 304, or other processor.

The controller 308 is configured to control the variable camber Krueger mechanism 304 to vary a shape of the camber 414 according to various operation conditions. The operation conditions may comprise, for example but without limitation, flight conditions, ground operations, and the like. The flight conditions may comprise, for example but without limitation, takeoff, cruise, approach, landing, and the like. The ground operations may comprise, for example but without limitation, air braking after landing, or other ground operations. The controller 308, may be located remotely from the variable camber Krueger mechanism 304, or may be coupled to the variable camber Krueger mechanism 304.

In operation, the controller 308 may control the variable camber Krueger mechanism 304 by sending actuation commands from the actuator 314 to the variable camber Krueger mechanism 304, thereby moving the variable camber Krueger flap 306.

The processor module 310 comprises processing logic that is configured to carry out the functions, techniques, and processing tasks associated with the operation of the system 300. In particular, the processing logic is configured to support the system 300 described herein. For example, the processor module 310 may direct the variable camber Krueger mechanism 304 to vary a shape of the camber 414 by moving the variable camber Krueger flap 306 based on various flight conditions.

The processor module 310 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 312 may comprise a data storage area with memory formatted to support the operation of the system 300. The memory module 312 is configured to store, maintain, and provide data as desired to support the functionality of the system 300. For example, the memory module 312 may store flight configuration data, control data, or other data.

In some configurations, the memory module 312 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 312 may be coupled to the processor module 310 and configured to store, for example but without limitation, a database, and the like. Additionally, the memory module 312 may represent a dynamically updating database containing a table for updating the database, and the like. The memory module 312 may also store a computer program that is executed by the processor module 310, an operating system, an application program, tentative data used in executing a program, or other application.

The memory module 312 may be coupled to the processor module 310 such that the processor module 310 can read information from and write information to the memory module 312. For example, the processor module 310 may access the memory module 312 to access an aircraft speed, a flight control surface position, an angle of attack, a Mach number, an altitude, or other data.

As an example, the processor module 310 and memory module 312 may reside in respective application specific integrated circuits (ASICs). The memory module 312 may also be integrated into the processor module 310. In a configuration, the memory module 312 may comprise a cache memory for storing temporary variables or other intermediate information during execution of instructions to be executed by the processor module 310.

Figure 4:
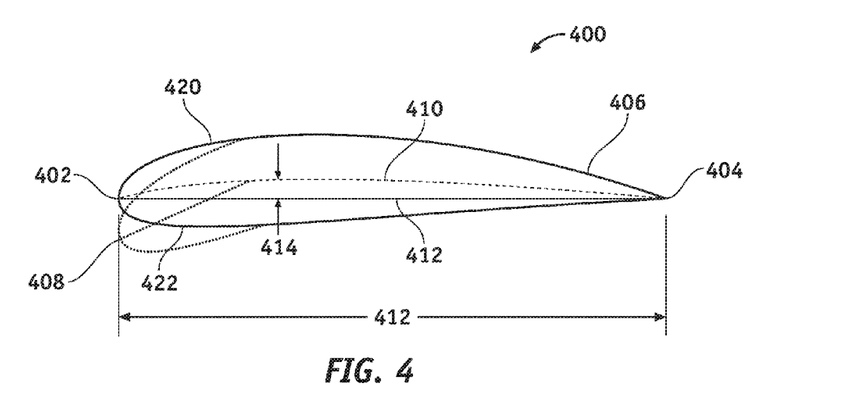
FIG. 4 is an illustration of an exemplary airfoil with variable camber according to a configuration of the disclosure.

FIG. 4 is an illustration of an exemplary airfoil 400 with variable camber according to a configuration of the disclosure. The airfoil 400 may comprise a leading edge 402, a trailing edge 404, the upper surface 420, and the lower surface 422. The airfoil 400 changes the camber 414 in response to control from the variable camber Krueger mechanism 304 (FIG. 3). As explained in more detail below, the variable camber Krueger mechanism 304 may be coupled in various ways to the airfoil 400. The variable camber Krueger mechanism 304 may configure the airfoil 400 into a first camber configuration 406 and a second camber configuration 408 by deploying the Krueger flap 306 at desired camber positions as explained below. The first camber configuration 406 may comprise, for example but without limitation, a stowed position, a barn door position, a high position, a landing position, a takeoff position, or other camber configuration. The second camber configuration 408 may comprise, for example but without limitation, a stowed position, a barn door position, a high position, a landing position, a takeoff position, or other camber configuration.

The airfoil 400 may be characterized by the mean camber line 410 (camber line) and a chord line 412. The camber line 410 may comprise a curve halfway between the upper surface 420 and the lower surface 422 of the airfoil 400 characterizing an asymmetry between the upper surface 420 and the lower surface 422. The camber 414 of the airfoil 400 can be defined by a camber line 410. The camber 414 may comprise distances between the camber line 410 and the chord line 412 defining a shape of the camber line 410.

Figure 5:
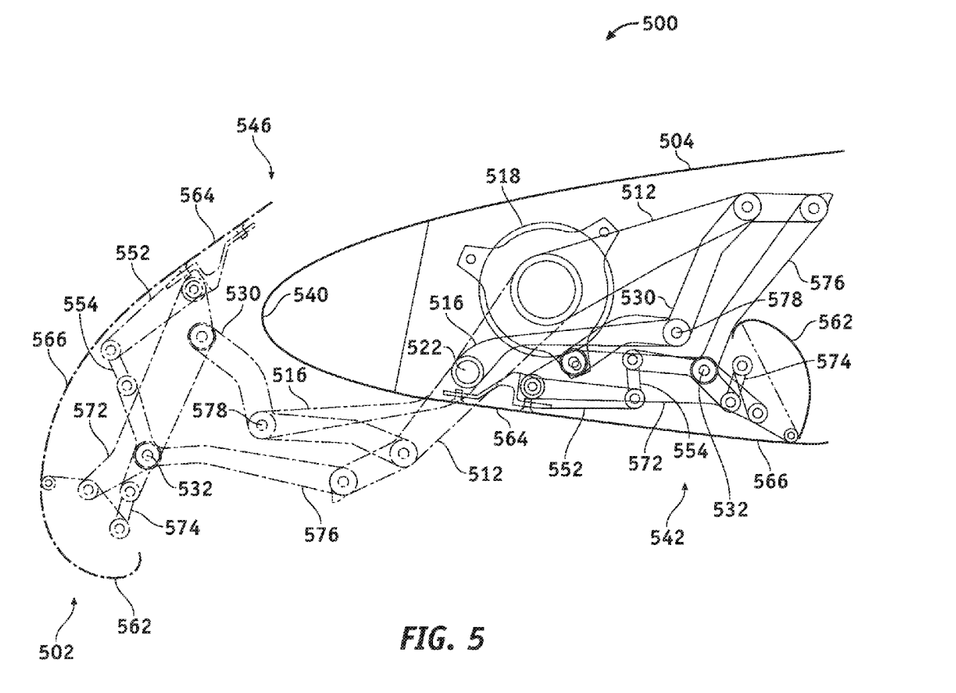
FIG. 5 is an illustration of an exemplary cross-sectional view of a variable camber Krueger flap mechanism according to a configuration of the disclosure.

FIG. 5 is an illustration of an exemplary cross-sectional view of a variable camber Krueger flap mechanism 500 (304 in FIG. 3) (flap deployment linkage mechanism 500) according to a configuration of the disclosure. The flap deployment linkage mechanism 500 is coupled to a flap assembly 502 and an aerodynamic body 504 (airfoil 302/400). The variable camber Krueger flap mechanism 500 comprises a rotation joint 522 for deploying the variable camber Krueger flap 306 (flap assembly 502).

The flap assembly 502 (variable camber Krueger flap 306 in FIG. 3) may comprise a bullnose member 562, a trailing end member 564, and a flexible surface 566 coupled between the bullnose member 562 and the trailing end member 564. In some configurations, a camber (curvature) of the flap assembly 502 may be changed in response to a change in position of the bullnose member 562, the trailing end member 564, and the flexible surface 566. The bullnose member 562 is pivotally mounted on the aerodynamic body 504 forming a part of the flap assembly 502. The bullnose member 562 may comprise, for example but without limitation, a convex bullnose shape, or other suitable configuration.

The flap assembly 502 may be deployed by the flap deployment linkage mechanism 500 from the aerodynamic body 504 through a plurality of positions 542-546. The positions 542-546 may begin deployment at a stowed position 542 (also shown in FIG. 6), and move through intermediate positions to a deployed position. The deployed position may comprise, for example but without limitation, a barn door position 544 (shown in FIG. 7), a high position 546 (shown in FIG. 8), or other deployed position. The flap deployment linkage mechanism 500 may comprise a first linkage assembly, a second linkage assembly, and a flap linkage assembly.

The first linkage assembly is configured to couple to the flap assembly 502 and the aerodynamic body 504. The first linkage assembly comprises a first drive arm 512, a first drive link 530, and a support arm 516. The first drive arm 512 is configured to couple to an actuator 518 (drive motor 518) coupled to the aerodynamic body 504, and is configured to rotate in a chord-wise rotational plane 560 (FIG. 8) when driven by the actuator 518. The first drive link 530 is coupled to the first drive arm 512 and the trailing end member 564 of the flap assembly 502 via the flap link 572. The support arm 516 is coupled to a middle link portion 578 of the first drive link 530 and is rotatably coupled to the aerodynamic body 504 at the rotation joint 522. The actuator 518 may comprise, for example but without limitation, a drive motor, a shape memory alloy, or other actuator.

The second linkage assembly is operable to couple to the flap assembly 502 and the first drive arm 512. The second linkage assembly comprises a drive transfer arm 576, a middle connection segment 554, and the bullnose link 574. The drive transfer arm 576 is coupled to a middle flap portion 532 of the flap link 572 of the flap assembly 502. The middle connection segment 554 is configured to couple the drive transfer arm 576 to the trailing end member 564 of the flap assembly 502. The bullnose link 574 is configured to couple the drive transfer arm 576 to the bullnose member 562 of the flap assembly 502. The bullnose link 574 is coupled to the bullnose member 562 and the drive transfer arm 576.

The flap linkage assembly comprises the flap link 572 and a flap trailing end link 552. The flap link 572 is coupled to the bullnose member 562, the trailing end member 564 via the flap trailing end link 552, the first drive link 530, and the drive transfer arm 576. The flap trailing end link 552 is coupled to the trailing end member 564, the middle connection segment 554, the flap link 572, and the first drive link 530 via the flap link 572.

Figure 6:
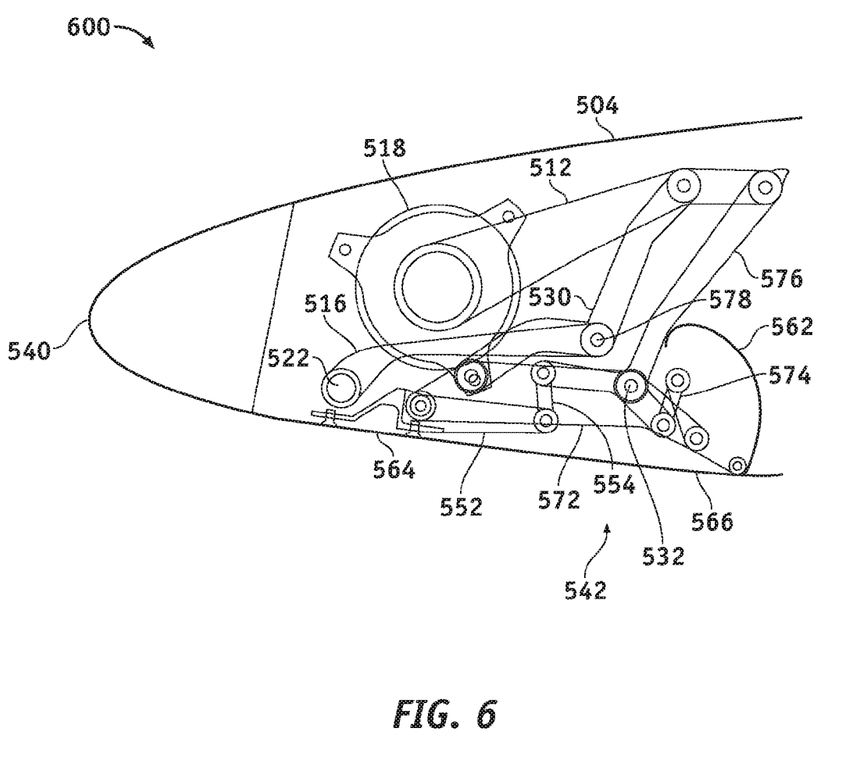
FIG. 6 is an illustration of an exemplary cross-sectional view of the variable camber Krueger flap mechanism of FIG. 5 in a stowed position according to a configuration of the disclosure.

FIG. 6 is an illustration of an exemplary cross-sectional view 600 of the variable camber Krueger flap mechanism 500 of FIG. 5 in a stowed position 542 according to a configuration of the disclosure. The flap assembly 502 is positioned in the stowed position 542 relative to the aerodynamic body 504 (airfoil 302 in FIG. 3)

Figure 7:
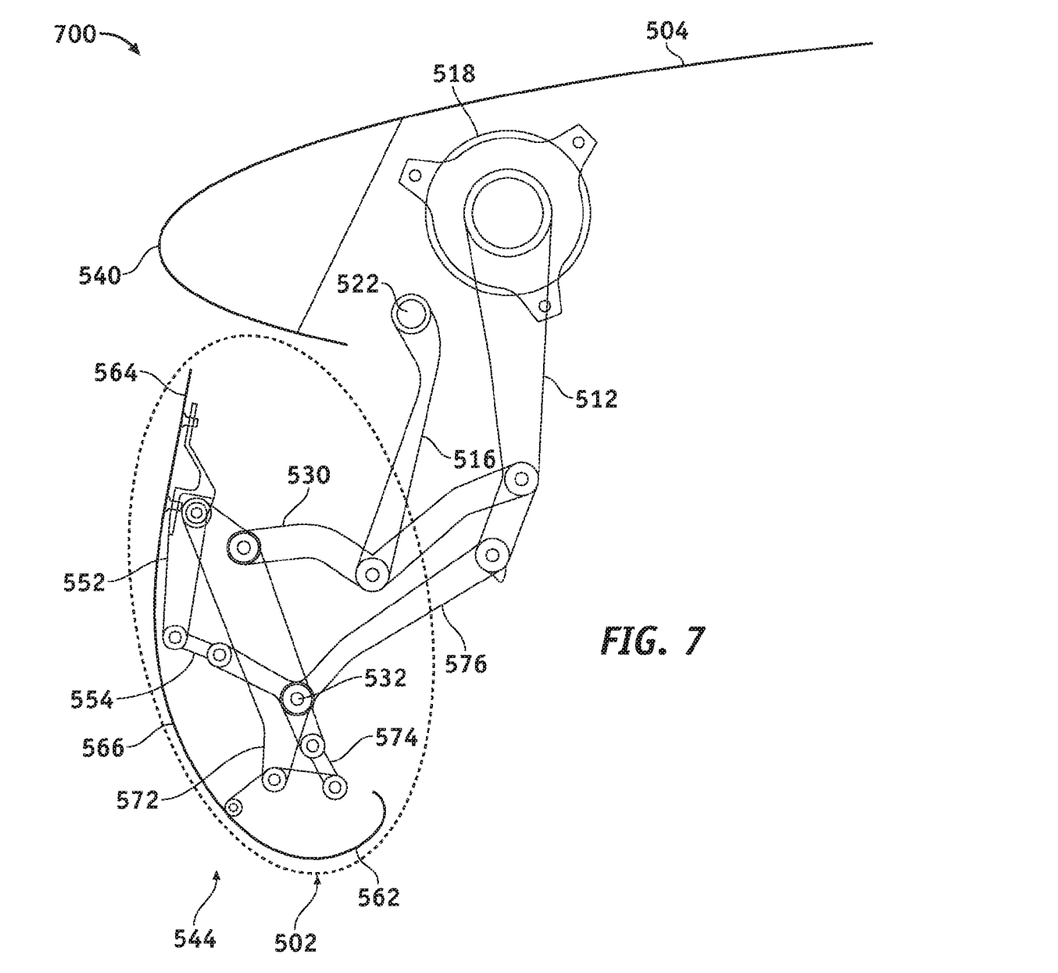
FIG. 7 is an illustration of an exemplary cross-sectional view of the variable camber Krueger flap mechanism of FIG. 5 in a barn door position according to a configuration of the disclosure.

FIG. 7 is an illustration of an exemplary cross-sectional view 700 of the variable camber Krueger flap mechanism 500 of FIG. 5 in a barn door position 544 according to a configuration of the disclosure. The barn door position 544 is an in-transit position, as the variable camber Krueger flap 306 is being deployed to landing/takeoff detents. The barn door position 544 is an aerodynamically favorable position. In this position, and in other deployed positions, the variable camber Krueger flap mechanism 500 can be subject to high loads generated by aerodynamic forces acting on the flap assembly 502. The variable camber Krueger flap mechanism 500 can be configured to efficiently transmit aerodynamic loads to the aerodynamic body 504. The variable camber Krueger flap mechanism 500 can transmit loads generally in compression or tension, without incurring significant bending loads. However, some joints such as the drive transfer arm 576 and the first drive link 530 may have bending loads.

Figure 8:
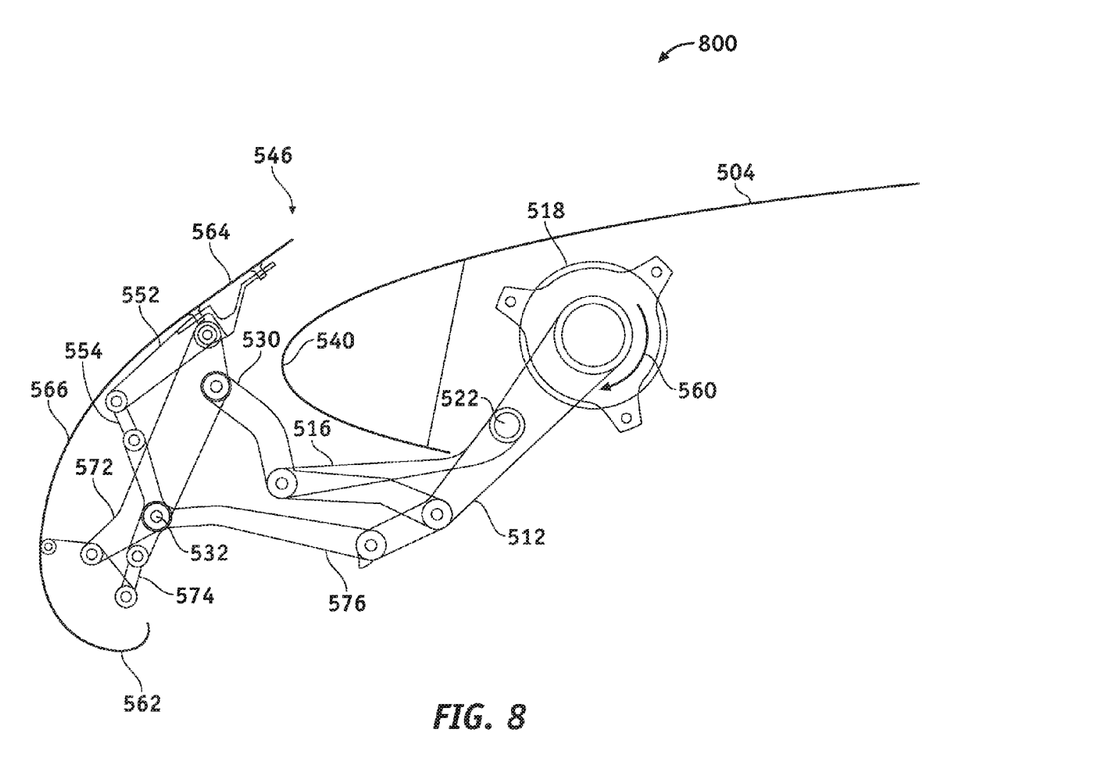
FIG. 8 is an illustration of an exemplary cross-sectional view of the variable camber Krueger flap mechanism of FIG. 5 in a high position according to a configuration of the disclosure.

FIG. 8 is an illustration of an exemplary cross-sectional view 800 of the variable camber Krueger flap mechanism 500 of FIG. 5 in a high position 546 according to a configuration of the disclosure. The flap assembly 502 (Krueger flap 306) is positioned in an elevated position (high position) relative to the aerodynamic body 504 (airfoil 302 in FIG. 3) sufficient to provide high-lift capability. The elevated position or high position may comprise, for example but without limitation, a position sufficiently elevated relative to the aerodynamic body 504 to affect or improve an air flow over the aerodynamic body 504, or other suitable configuration. "High-lift" may comprise, for example but without limitation, improved lift performance during various phases of flight such as, but without limitation, takeoff, landing, or other flight condition. The high-lift capability can improve high angle of attack performance during various phases of flight such as, but without limitation, takeoff, landing, or other flight condition.

Figure 9:
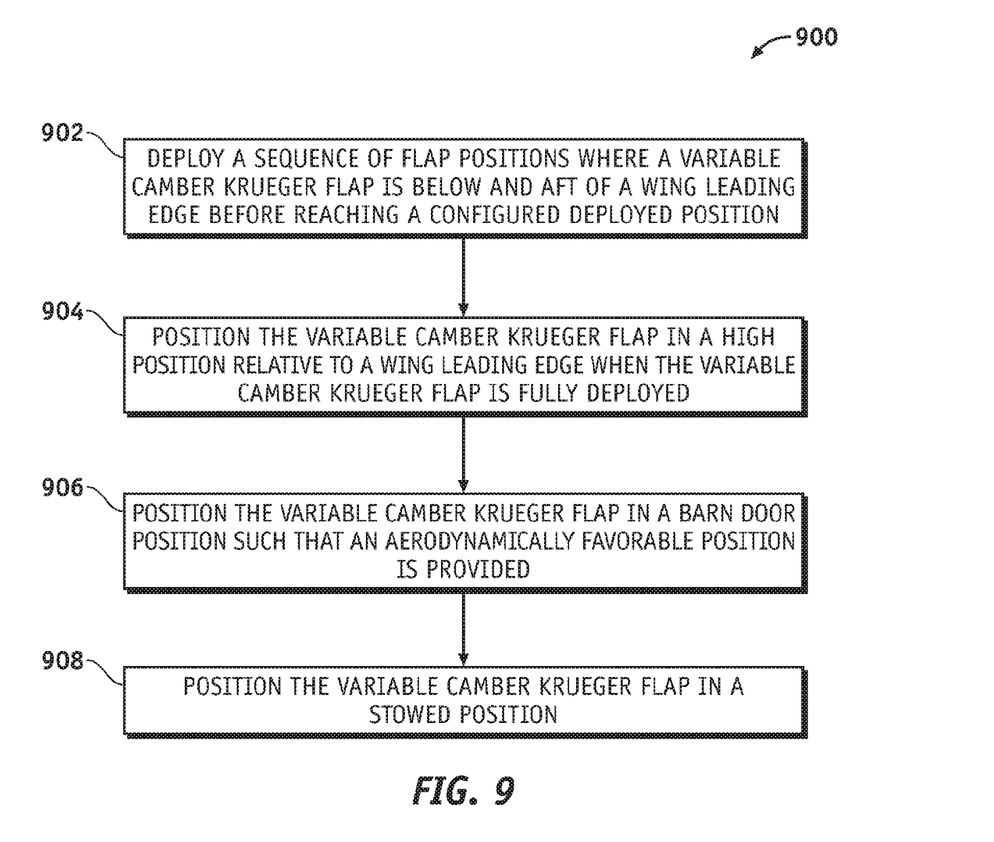
FIG. 9 is an illustration of an exemplary flowchart showing a process for providing a variable camber fluid-dynamic body system according to a configuration of the disclosure.

FIG. 9 is an illustration of an exemplary flowchart showing a process 900 for providing a variable camber Krueger flap system according to a configuration of the disclosure. The various tasks performed in connection with process 900 may be performed mechanically, by software, hardware, firmware, computer-readable software, computer readable storage medium, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-8. In some configurations, portions of the process 900 may be performed by different elements of the system 300 such as: the fluid-dynamic body 302, the variable camber Krueger mechanism 304, the controller 308, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by the variable camber Krueger flap mechanism 500 deploying a sequence of flap positions where a variable camber Krueger flap such as the variable camber Krueger flap 306 (flap assembly 502) is below and aft of a wing leading edge such as the wing leading edge 540 before reaching a configured deployed position (task 902).

Process 900 may continue by the variable camber Krueger flap mechanism 500 positioning the variable camber Krueger flap 306 in a high position relative to the wing leading edge 540 when the variable camber Krueger flap 306 is fully deployed (task 904). The fully deployed position may be at the high position 546 in FIG. 5.

Process 900 may continue by the variable camber Krueger flap mechanism 500 positioning the variable camber Krueger flap 306 (flap assembly 502) in a barn door position such as the barn door position 544 providing an aerodynamically favorable position (task 906). As mentioned above, the barn door position 544 is an in-transit position, as the variable camber Krueger flap 306 is being deployed to the landing/takeoff detents. The barn door position is an aerodynamically favorable position.

Process 900 may continue by the variable camber Krueger flap mechanism 500 positioning the variable camber Krueger flap 306 (flap assembly 502) in a stowed position such as the stowed position 542 (task 908).

In this manner, the configurations of the disclosure provide various means for configuring a camber of a fluid-dynamic body.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-8 depict example arrangements of elements, additional intervening elements, devices, features, or components may be present in a configuration of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 310 to cause the processor module 310 to perform specified operations. Such instructions, generally referred to as "computer program code" or "program code" (which may be grouped in the form of computer programs or other groupings), when executed, enable variable camber Krueger flap mechanism 500 of the system 300.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method to enable high-lift over a fluid-dynamic body using a variable camber Krueger flap deployment linkage mechanism, the method comprising:
   deploying a variable camber Krueger flap through a sequence of flap positions including:
      positioning the variable camber Krueger flap below and aft of a wing leading edge; and positioning the variable camber Krueger flap in a fully deployed position in which at least a portion of the variable camber Krueger flap is above and fore of the wing leading edge;

wherein the variable camber Krueger flap has a bullnose member and a trailing end member, wherein the variable camber Krueger flap deployment linkage mechanism comprises a flap linkage assembly coupling a first linkage assembly and a second linkage assembly to the Krueger flap, the flap linkage assembly comprising a flap link coupled to the bullnose member and the trailing end member, wherein the first linkage assembly is coupled to the flap linkage assembly and an airfoil, the first linkage assembly comprising:
 a first drive arm configured to couple to an actuator coupled to the airfoil, and configured to rotate in a chord-wise plane,
 a first drive link coupled to the first drive arm and a trailing end of the flap assembly, and
 a support arm coupled to a middle link portion of the first drive link and configured to rotatably couple to the airfoil at a rotation joint, wherein the second linkage assembly is coupled to the flap assembly and the first drive arm, the second linkage assembly comprising a drive transfer arm coupled to the flap assembly, wherein the flap link, the first drive link, the first drive arm, and the drive transfer arm form a four bar linkage, and wherein the middle link portion is located between a first end of the first drive link and a second end of the first drive link.

2. The method of claim 1, further comprising positioning the variable camber Krueger flap in a barn door position providing an aerodynamically favorable position.

3. The method of claim 1, further comprising positioning the variable camber Krueger flap in a stowed position.

4. The method of claim 1, wherein the second linkage assembly further comprises:
 a middle connection segment configured to couple the drive transfer arm to the trailing end of the flap assembly; and
 a bullnose link configured to couple the drive transfer arm to the bullnose member of the flap assembly.

5. The method of claim 1, wherein the flap assembly comprises the bullnose member, the trailing end member, and a flexible surface coupled between the bullnose member and the trailing end member.

6. The method of claim 1, further comprising positioning the variable camber Krueger flap in the fully deployed position during at least one of takeoff or landing of an aircraft comprising the variable camber Krueger flap.

7. The method of claim 1, further comprising varying a shape of a camber of the variable camber Krueger flap based on a flight condition.

8. The method of claim 7, wherein the flight condition includes at least one condition selected from the group consisting of a takeoff condition, a cruise condition, an approach condition, and a landing condition.

9. The method of claim 7, wherein the flight condition includes at least one condition selected from the group consisting of an aircraft speed, a flight control surface position, an angle of attach, a Mach number, and an altitude.

10. The method of claim 7, wherein the variable camber Krueger mechanism comprises a shape memory alloy that varies the shape of the camber responsive to an ambient temperature.

11. The method of claim 1, further comprising the actuator and the airfoil.

12. The method of claim 1, wherein the variable Krueger flap further comprises:
 a flap trailing end link coupled to the trailing end member and the flap link, the flap link coupled to the trailing end member via the flap trailing end link,
 wherein the first drive link coupled at the first end to the first drive arm and coupled at the second end to the trailing end member of the variable camber Krueger flap via the flap trailing end link,
 wherein the drive transfer arm is coupled to a middle flap portion of the flap link,
 a middle connection segment coupled to the drive transfer arm and to the flap trailing end link, and
 a bullnose link configured to couple the drive transfer arm to the bullnose member.

13. A method to enable high-lift over a fluid-dynamic body using a variable camber Krueger flap deployment linkage mechanism, the method comprising:
 positioning, using the variable camber Krueger flap deployment linkage mechanism, a variable camber Krueger flap in a stowed position below and aft of a wing leading edge;
 moving, using the variable camber Krueger flap deployment linkage mechanism, the variable camber Krueger flap from the stowed position to a barn door position; and
 moving, using the variable camber Krueger flap deployment linkage mechanism, the variable camber Krueger flap from the barn door position to an elevated position in which at least a portion of the variable camber Krueger flap is above and fore of the wing leading edge;

wherein the variable camber Krueger flap has a bullnose member and a trailing end member, wherein the variable camber Krueger flap deployment linkage mechanism comprises a flap linkage assembly coupling a first linkage assembly and a second linkage assembly to the Krueger flap, the flap linkage assembly comprising a flap link coupled to the bullnose member and the trailing end member, wherein the first linkage assembly is coupled to the flap linkage assembly and an airfoil, the first linkage assembly comprising:
 a first drive arm configured to couple to an actuator coupled to the airfoil, and configured to rotate in a chord-wise plane,
 a first drive link coupled to the first drive arm and a trailing end of the flap assembly, and
 a support arm coupled to a middle link portion of the first drive link and configured to rotatably couple to the airfoil at a rotation joint, wherein the second linkage assembly is coupled to the flap assembly and the first drive arm, the second linkage assembly comprising a drive transfer arm coupled to the flap assembly, wherein the flap link, the first drive link, the first drive arm, and the drive transfer arm form a four bar linkage, and wherein the middle link portion is located between a first end of the first drive link and a second end of the first drive link.

14. The method of claim 13, wherein, in the barn door position, the variable Krueger flap is in an aerodynamically favorable position subjected to high loads generated by aerodynamic forces acting on the variable camber Krueger flap.

15. The method of claim 13, further comprising varying a shape of a camber of the variable camber Krueger flap based on a flight condition.

16. The method of claim 15, wherein the flight condition includes at least one condition selected from the group consisting of a takeoff condition, a cruise condition, an approach condition, and a landing condition.

17. The method of claim 15, wherein the flight condition includes at least one condition selected from the group consisting of an aircraft speed, a flight control surface position, an angle of attack, a Mach number, and an altitude.

18. The method of claim 15, wherein the variable camber Krueger deployment linkage mechanism comprises a shape memory alloy that varies the shape of the camber responsive to an ambient temperature.

19. A non-transitory computer-readable medium having stored thereon, program instructions that when executed by a processor, actuate an actuator to cause a variable camber Krueger deployment linkage to perform a set of acts comprising:
    positioning a variable camber Krueger flap in a stowed position below and aft of a wing leading edge; and
    moving the variable camber Krueger flap from the stowed position to an elevated position above and fore of the wing leading edge in the elevated position;
    wherein the variable camber Krueger flap has a bullnose member and a trailing end member,
    wherein the variable camber Krueger flap deployment linkage mechanism comprises a flap linkage assembly coupling a first linkage assembly and a second linkage assembly to the Krueger flap, the flap linkage assembly comprising a flap link coupled to the bullnose member and the trailing end member,
    wherein the first linkage assembly is coupled to the flap linkage assembly and an airfoil, the first linkage assembly comprising:
        a first drive arm configured to couple to an actuator coupled to the airfoil, and configured to rotate in a chord-wise plane,
        a first drive link coupled to the first drive arm and a trailing end of the flap assembly, and
        a support arm coupled to a middle link portion of the first drive link and configured to rotatably couple to the airfoil at a rotation joint,
    wherein the second linkage assembly is coupled to the flap assembly and the first drive arm, the second linkage assembly comprising a drive transfer arm coupled to the flap assembly,
    wherein the flap link, the first drive link, the first drive arm, and the drive transfer arm form a four bar linkage, and
    wherein the middle link portion is located between a first end of the first drive link and a second end of the first drive link.

20. The non-transitory computer-readable medium of claim 19, wherein the set of acts further comprises:
    moving the variable camber Krueger flap from the stowed position to a barn door position; and
    moving the variable camber Krueger flap from the barn door position to the elevated position,
    wherein, in the barn door position, the variable Krueger flap is in an aerodynamically favorable position subjected to high loads generated by aerodynamic forces acting on the variable camber Krueger flap.

* * * * *